United States Patent
Yamazaki et al.

(10) Patent No.: US 6,673,415 B1
(45) Date of Patent: Jan. 6, 2004

(54) HONEYCOMB CORE MATERIAL FOR SANDWICH STRUCTURE AND METHOD FOR MANUFACTURING THE SAME

(75) Inventors: Kaoru Yamazaki, Kyoto (JP); Yasushi Kumagai, Kyoto (JP); Tomokazu Shimizu, Kyoto (JP); Akira Inoue, Tokyo (JP); Masamichi Taguchi, Tokyo (JP); Kengo Ozaki, Tokyo (JP)

(73) Assignees: Sanyo Chemical Industries, Ltd., Kyoto (JP); Asahi Fiber Glass Company, Limited, Tokyo (JP)

(*) Notice: Subject to any disclaimer, the term of this patent is extended or adjusted under 35 U.S.C. 154(b) by 0 days.

(21) Appl. No.: 09/869,319

(22) PCT Filed: Nov. 24, 2000

(86) PCT No.: PCT/JP00/08295

§ 371 (c)(1),
(2), (4) Date: Jul. 24, 2001

(87) PCT Pub. No.: WO01/38081

PCT Pub. Date: May 31, 2001

(30) Foreign Application Priority Data

Nov. 26, 1999 (JP) .............................. 11-335902

(51) Int. Cl.$^7$ ................................ B32B 3/12
(52) U.S. Cl. .................... 428/117; 428/73; 428/71; 428/306.6; 428/307.3; 428/312.2; 428/313.3; 428/593; 428/920; 428/921
(58) Field of Search .................. 428/71–73, 116, 428/117, 174, 178, 304.4, 306.6, 307.3, 312.2, 313.3, 593, 920, 921

(56) References Cited

U.S. PATENT DOCUMENTS

| | | | |
|---|---|---|---|
| 3,934,066 A | 1/1976 | Murch | |
| 4,299,872 A | 11/1981 | Miguel et al. | |
| 4,557,961 A | * 12/1985 | Gorges | |
| 4,687,691 A | * 8/1987 | Kay | |
| 5,753,340 A | 5/1998 | Welch et al. | |

FOREIGN PATENT DOCUMENTS

| | | |
|---|---|---|
| EP | 0 853 073 | 7/1998 |
| GB | 1 179 442 | 1/1970 |
| GB | 1 387 692 | 3/1975 |
| JP | 10-231568 | 9/1998 |
| JP | 11-277550 | 10/1999 |

OTHER PUBLICATIONS

Patent Abstracts of Japan, JP 03 272836, Dec. 4, 1991.
Patent Abstracts of Japan, JP 54 032573, Mar. 9, 1979.

* cited by examiner

*Primary Examiner*—Deborah Jones
*Assistant Examiner*—Wendy Boss
(74) *Attorney, Agent, or Firm*—Oblon, Spivak, McClelland, Maier & Neustadt, P.C.

(57) ABSTRACT

A honeycomb core material which is excellent in flame retardation, thermal insulation and noise insulation and has improved transportability and handling efficiency and which can be suitably used also for a sandwich structure of a curved shape as a foam has flexibility and elasticity, and a method for its production.

A composite foam comprising a phosphoric acid type inorganic foam and a urethane type organic foam, obtained by foaming and curing an aqueous mixture containing a phosphorus-containing acid material, a curing agent, a blowing agent and a urethane polymer having NCO groups, is filled in cells of a honeycomb body having a cell size of from 3 to 100 mm and a porosity of from 92 to 99.5% according to JIS-A6931.

23 Claims, 1 Drawing Sheet

HONEYCOMB CORE MATERIAL FOR SANDWICH STRUCTURE AND METHOD FOR MANUFACTURING THE SAME

TECHNICAL FIELD

The present invention relates to a honeycomb core material for a sandwich structure and a method for its production.

BACKGROUND ART

Heretofore, a sandwich structure having a honeycomb core material sandwiched by rigid surface materials made of e.g. a steel plate, has been widely used as an interior or exterior panel for a building material such as a door or a partition, or as a material for a structure such as an aircraft or a vehicle, since it is excellent in such characteristics as light weight, rigidity, sound absorption and thermal insulation. In order to improve the sound absorption or thermal insulation among such various characteristics of the structure, a honeycomb core material having a resin foam filled in cells of the honeycomb body, has also been known.

However, with a conventional honeycomb core material having a resin foam filled, the resin foam filled in cells was hard and brittle, and if bending occurred by e.g. transportation, the foam was likely to slip off from the cells, and consequently, the transportability or handling efficiency was poor. Further, in a state where the resin foam was not filled over the entire cells of the honeycomb core material, the thermal insulation of the honeycomb core material was non-uniform or poor. Therefore, JP-A-1-301329 proposes to prevent slipping off of the foam by providing a notch at one end of the cell wall of the honeycomb core material. However, in this case, the partition wall was not continuous, and there was a problem that the mechanical strength, particularly the shear strength, was poor.

On the other hand, PCT publication WO97/11925 discloses a foam of a phosphorus-containing acid material as one which is excellent in non-combustibility and fire proof property and whereby the foam can be molded under ordinary temperature and ordinary pressure conditions. However, such a foam was flexible and had elasticity, and by itself, it was sometimes inadequate as a structure whereby rigidity was required.

An object of the present invention is to provide a honeycomb core material whereby a resin foam is flexible and has elasticity while maintaining the thermal insulation and noise insulation of a honeycomb core material having a conventional resin foam filled, and which is suitable for a sandwich structure having improved transportability and handling efficiency and useful also for a curved sandwich structure, and a method for its production.

DISCLOSURE OF THE INVENTION

The present invention has been made to accomplish the above object. Namely, the present invention resides in a honeycomb core material for a sandwich structure, which comprises a honeycomb body and a filler filled in at least a part of cells thereof, wherein the honeycomb body has a cell size of from 3 to 100 mm and a porosity of from 92 to 99.5%, as stipulated in JIS-A6931, and the filler is a composite foam comprising an inorganic foam obtained from a phosphorus-containing acid material (a), a curing agent (b) and, if necessary, a blowing agent (c), and an organic foam obtained from a urethane prepolymer having NCO groups (d), and water (e).

Further, the present invention resides in a method for producing a honeycomb core material for a sandwich structure, which comprises filling a mixture comprising a phosphorus-containing acid material (a), a curing agent (b), a urethane prepolymer having NCO groups (d), water (e) and, if necessary, a blowing agent (c), in cells of a honeycomb body having a cell size of from 3 to 100 mm and a porosity of from 92 to 99.5%, as stipulated in JIS-A6931, followed by foaming and curing.

Such a honeycomb core material according to the present invention is excellent in flame retardation or non-flammability which can not be attained by a conventional organic foam and is flexible and has elasticity, which can not be obtained by a conventional inorganic foam, as the filler in its cells is composed of the above-mentioned inorganic and organic composite foam. In addition, according to the discovery by the present inventors, it has been found that when components to form such a composite foam, are foamed and cured in cells of the honeycomb body, the foaming and expansion force of the foam bring about an extremely high adhesiveness between the honeycomb and the filler in combination with the inherently high adhesiveness of a urethane polymer.

The honeycomb core material of the present invention is thereby free from slipping off of the filler from the honeycomb body and easy in transportation or handling, and also has flexibility and modification in shape after the production is possible, whereby surface materials such as flat plates can easily be attached to the honeycomb core material, and it becomes possible to apply it to a structure having a curved shape.

BEST MODE FOR CARRYING OUT THE INVENTION

Figure 1:
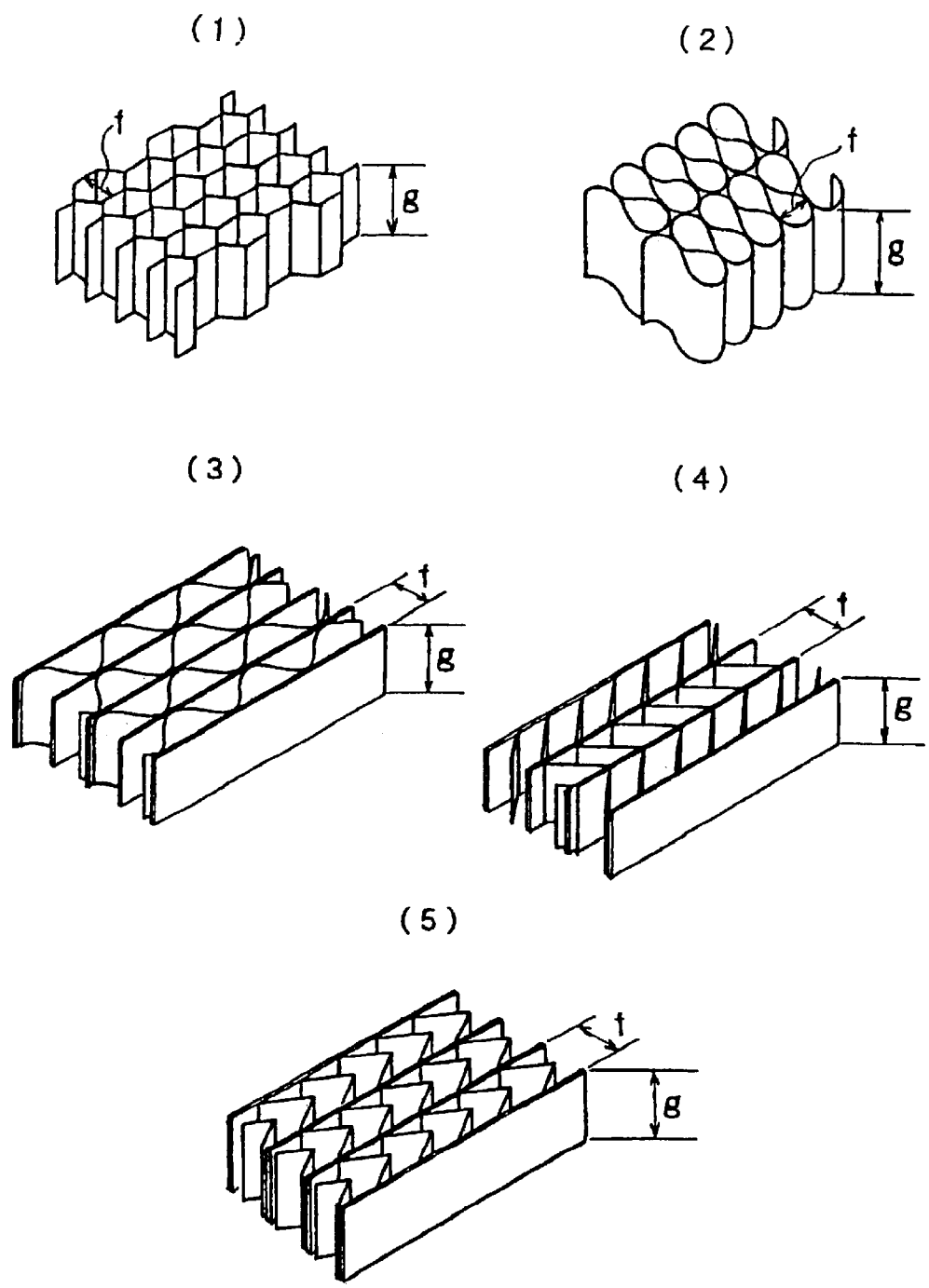
FIG. 1 shows perspective views of some typical examples of the honeycomb body to be used for the honeycomb core material of the present invention. In these examples, the cells have the following shapes. (1) hexagonal shape, (2) circular shape, (3) cardboard shape, (4) rib shape, and (5) origami shape.

Now, the present invention will be described in further detail.

The honeycomb body to form the honeycomb core material of the present invention has a conformation having substantially continuous geometrical cells (through holes) of a polygonal shape such as a hexagonal shape, a tetragonal shape, or a triangular shape, a circular shape or an inequilateral polygonal shape, defined by partition walls made of a continuous member. The cell size and the porosity of the honeycomb body relate to the rigidity of the honeycomb core material to be produced, and they are stipulated by JIS-A6931. The cell size is represented by (f) in the attached FIG. 1, and it is preferably from 3 to 100 mm, particularly preferably from 5 to 50 mm. The porosity is defined by (volume occupied by the honeycomb body—volume of the partition wall material of the honeycomb body)/volume occupied by the honeycomb body. In the present invention, it is suitably from 92 to 99.5%, particularly from 93 to 98%.

If the porosity of the honeycomb body is smaller than the above range, the foam is likely to deposit on the partition walls of the cells, at the time of filling, whereby the filling tends to be difficult, and at the same time, the proportion occupied by the honeycomb body tends to be large, and the amount of the honeycomb body which readily transmits heat, increases, whereby the thermal insulation of the honeycomb core material deteriorates, and the weight tends to increase, such being undesirable. On the other hand, if it is large, the proportion occupied by the honeycomb body tends to be small, and the strength of the honeycomb core material tends to decrease, such being undesirable. The thickness of the partition walls of the honeycomb body has an inversely proportional relation with this porosity, but, it is preferably from 0.02 to 3 mm.

The thickness of the honeycomb body is represented by (g) in FIG. 1 and is suitably selected depending upon the required mechanical properties, thermal insulating property, noise insulating property, fire preventing property, etc. For example, for partition of an office, a thin thickness of not more than 50 mm, is preferred, and in a case where fire prevention or flame resistance is required, it is preferably at least 40 mm. Further, with a refrigerator-freezer panel which requires a thermal insulating property, it is preferably from 200 to 400 mm.

The material of the honeycomb body may, for example, be a metal, a paper, a flame retardant paper, a composite material of a fiber and a resin, a plastic, a ceramics or a ceramics paper. The above metal may, for example, be aluminum, stainless steel or steel. The above paper may, for example, be a craft paper, a paper made of a vegetable fiber such as pulp or made of a synthetic fiber such as polyester, polyamide, rayon or polyvinyl alcohol, a paper made of an organic or inorganic fiber such as aramide paper, graphite paper or glass paper, or a flame retardant paper obtained by adding and mixing magnesium silicate, aluminum hydroxide, antimony oxide, a phosphorus compound, a halogenated compound, a boron compound, etc. to a fibrous material used therefor during the preparation of the paper, or by the post impregnation after preparation of the paper or after preparation of a honeycomb.

Further, the composite material of the above fiber and a resin, may, for example, be a resin-impregnated honeycomb made of a fiber and a resin obtained by impregnating a thermosetting resin such as phenol, polyimide, polyester or epoxy, or a thermoplastic resin such as nylon or polyimide, to the above-mentioned various papers, and inorganic and organic woven or non-woven fabrics of e.g. glass, graphite, aramide, a thermoplastic polyester, rayon, polyamide, polyvinyl alcohol or pulp. Further, the above plastic honeycomb may, for example, be a honeycomb made of e.g. vinyl chloride, polypropylene, polyethylene, polyurethane, polyimide, polyetherimide or polycarbonate. Further, the above ceramic honeycomb, may, for example, be a honeycomb made of e.g. cordielite or mullite. The above ceramic paper honeycomb, may, for example, be a honeycomb made of e.g. alumina or alumina silica fiber.

Among them, a metal honeycomb made of aluminum, stainless steel or steel, a resin-impregnated honeycomb made of a phenol resin-impregnated honeycomb or a polyimide resin-impregnated honeycomb, or a flame retardant honeycomb, of which the incineration residue in the test stipulated in JIS-P8128 is at least 40 wt %, is preferred for such reasons as mechanical properties, heat resistance, flame retardancy, light unit weight and price. It is particularly preferred to employ a flame retardant paper honeycomb having at least 40 wt % of magnesium silicate or aluminum hydroxide incorporated, from the viewpoint of excellent mechanical strength and thermal insulation property, and a low price.

The above aluminum honeycomb is usually one using a foil of an aluminum alloy such as 5052, 5056, 2024, 3003 or 3004 as stipulated in JIS-H4000. The above steel honeycomb is preferably one obtained by bonding relatively low carbon steel foils with an adhesive, followed by expanding. Further, the metal honeycomb may be one so-called a corrugated honeycomb obtained by forming a metal foil into a corrugated shape, followed by bonding, and to such a metal honeycomb, corrosion resistant coating treatment may be applied as the case requires.

When a metal honeycomb is thereby used, the adhesion to the urethane component or the phosphorus-containing acid material in the foam will be good, whereby there will be no slipping off of the foam even with a metal honeycomb having a relatively large cell size, and the handling efficiency will also be good.

Further, as the phenol resin-impregnated honeycomb and the polyimide resin-impregnated honeycomb, preferred is one having a phenol resin or a polyimide resin impregnated to a paper made of a vegetable fiber such as craft or pulp, an aramide paper, a glass paper, a glass fiber woven fabric, a graphite fiber woven fabric or an aramide fiber woven fabric.

It has been found that when a honeycomb containing the above vegetable fiber or an organic substance such as a resin, is used, the honeycomb having the foam filled in the present invention has a better flame retardation property as a honeycomb core material than the honeycomb having no foam filled (i.e. the honeycomb itself).

Further, as the flame retardant paper honeycomb containing aluminum hydroxide or magnesium silicate, preferred is one obtained by sheeting aluminum hydroxide or magnesium silicate together with an organic fiber such as pulp or an inorganic fiber such as glass fiber into a paper form, and bonding such sheets by an adhesive, followed by expanding.

By using the honeycomb having magnesium silicate or aluminum hydroxide incorporated, the mechanical strength can be remarkably improved over the mechanical strength of the core material expected from a combination of a usual honeycomb and a foam.

In the present invention, the filler to be filled in the honeycomb body is made of a composite foam comprising an inorganic foam obtained from a phosphorus-containing acid material (a), a curing agent (b) and, if necessary, a blowing agent (c), and an organic foam obtained from a urethane prepolymer having NCO groups (d) and water (e). The curing agent (b) and the blowing agent (c) to form the inorganic foam, may be a single substance having both functions, or may be separate substances, respectively. Such an inorganic foam is excellent in flame retardancy and rigidity, but has a weak point in brittleness. However, with the foam of the present invention, the brittleness can be substantially overcome by the combination with the organic foam obtained from the urethane prepolymer and water.

The ratio of the inorganic foam to the organic foam in the composite foam relates to the physical property of the filler in the present invention, and accordingly relates to the characteristics of the honeycomb core material. The ratio (by weight) of the inorganic foam/the organic foam is preferably from 3/1 to 50/1. When the ratio of the inorganic foam to the organic foam is at most 50 times, the adhesiveness and the flexibility are good without brittleness. On the other hand, if it is at least 3 times, the flame retardation or the fire preventing property will be good. Further preferably, this ratio is from 5/1 to 30/1.

The composite foam of the present invention can be obtained by filling a mixture comprising a phosphorus-containing acid material (a), a curing agent (b), a urethane prepolymer having NCO groups (d), water (e) and, if necessary, a blowing agent (c), in cells of the honeycomb body, followed by foaming and curing, for example, by preparing an aqueous mixture comprising a phosphorus-containing acid material (a), a curing agent (b), a blowing agent (c) and a urethane prepolymer (d), filling this mixture in cells of the honeycomb body, and foaming and curing the inorganic foam and the organic foam substantially simultaneously. It is important that the inorganic foam made from (a) and (b), and, if necessary, (c), and the organic foam made from (d) and (e), are substantially simultaneously foamed and cured, and permitted to foam in cells of the honeycomb, whereby a composite foam having the above-mentioned excellent characteristics, can be obtained.

In the composite foam in the present invention, as the phosphorus-containing acid material (a), for example, phosphoric acid, phosphorus acid, phosphoric anhydride, condensed phosphoric acids, polyvalent metal salts of these, salts of a water-soluble amine with such polyvalent metal salts, or a mixture of two or more of them, may be used. Among them, it is preferred to use an acid polyvalent metal phosphate such as a polyvalent metal primary phosphate or a polyvalent metal secondary phosphate, or a salt of such a phosphate with a water-soluble amine, in view of the water resistance, moisture resistance or high cell strength of the foam. As the above polyvalent (bivalent, trivalent or higher valent) metal, magnesium, calcium, aluminum, zinc, barium or iron, may, for example, be mentioned. Among them, magnesium, calcium or aluminum is preferred. Instead of a method of adding in the form of such a polyvalent metal phosphate or a polyvalent metal phosphite, it is possible to employ a method wherein a metal compound chemically active with phosphoric acid or phosphorus acid, for example, a polyvalent metal oxide such as magnesium oxide or calcium oxide, or a polyvalent metal hydroxide such as aluminum hydroxide, magnesium hydroxide or calcium hydroxide, is added into the system separately from the phosphorus-containing acid material such as phosphoric acid or phosphorus acid, and they are reacted in the system. Among them, as the phosphorus-containing acid material (a), it is particularly preferred to use phosphoric acid, magnesium primary phosphate, aluminum primary phosphate, zinc primary phosphate or a mixture of two or more of them, for such a reason that the water resistance, moisture resistance or the cell strength of the foam is high.

Further, as the phosphorus-containing acid material (a), it is most preferred to use a salt of an acid polyvalent metal phosphate with a water-soluble amine. Here, the water-soluble amine means one which dissolves in water in an amount of at least 1 wt % at 20° C. It is thereby possible to control abrupt foaming and curing of the aqueous mixture thereby to prolong the time in a non-foamed state i.e. the time having fluidity, whereby the thickness can be made uniform by e.g. doctor blade, and consequently it can be filled uniformly into the respective cells of the honeycomb body. Further, it is possible to fill the aqueous mixture into cells of the honeycomb body before it is foamed, whereby bubbles of the foam will not be damaged by the honeycomb body, and consequently, a constant uniform foaming can be carried out, and it becomes possible to improve the thermal insulating property and to reduce the weight, as the honeycomb core material.

The above water-soluble amine may, for example, be a secondary or tertiary alkyl amine (carbon number: 2 to 18) such as diethylamine, diisopropylamine, diallylamine, triethylamine or triallylamine; a heterocyclic amine (carbon number: 3 to 20) such as pyridine, piperidine, N-methyl piperidine, morpholine, N-methyl morpholine, N-ethyl morpholine or lutidine; an amino alcohol (carbon number: 2 to 18) such as monoethanolamine, N,N-dimethylethanolamine or N,N-diethyl ethanolamine; or a water-soluble amine having a boiling point within a range of from room temperature to about 200° C., such as urea. Preferred as the water-soluble amine is trimethylamine, N-ethyl morpholine, monoethanolamine or urea. The amount of the water-soluble amine to be added per equivalent of the acid polyvalent metal phosphate is usually from 0.01 to 1 equivalent, preferably from 0.05 to 0.5 equivalent.

The content of the phosphorus-containing acid material (a) in the foam of the present invention is from 3 to 20 wt %, particularly from 4 to 18 wt %, as a preferred range as converted to the atomic amount of phosphorus in the foam of the present invention. If the content of the phosphorus atom is less than 3 wt %, the flame preventing performance of the obtainable foam tends to be low. If the content of the phosphorus atom exceeds 20 wt %, the dispersibility of the prepolymer (d) tends to be low, whereby it tends to be difficult to obtain a uniform foamed structure.

As the above curing agent (b) in the foam of the present invention, a carbonate (b1), a metal oxide and/or a metal hydroxide (b2) or a light metal (b3) which generates a gas when reacted with an acid or an alkali, may be used, and two or more of them may be used in combination.

As a preferred example of the carbonate (b1), sodium carbonate, sodium hydrogencarbonate, potassium carbonate, ammonium carbonate, calcium carbonate, barium carbonate, basic magnesium carbonate or basic zinc carbonate may be mentioned. Among them, a polyvalent metal carbonate is preferred, and particularly preferred is a basic salt such as basic magnesium carbonate or basic zinc carbonate.

As a preferred example of the metal oxide (b2), sodium oxide, potassium oxide, calcium oxide, barium oxide, magnesium oxide or zinc oxide may be mentioned. The metal hydroxide (b2) may, for example, be sodium hydroxide, potassium hydroxide, calcium hydroxide, barium hydroxide, magnesium hydroxide or zinc hydroxide. Among them, a polyvalent metal oxide or a polyvalent metal hydroxide is particularly preferred. As the metal oxide and/or the metal hydroxide (b2), a non-reacted metal compound used in excess at the time of preparing (a) in a case where as the phosphorus-containing acid material (a), a reaction product of a phosphorus-containing acid material with a polyvalent metal oxide or a polyvalent metal hydroxide, is used, may be utilized.

As a preferred example of the above light metal (b3), magnesium, aluminum or zinc may be mentioned. Among (b), preferred is (b1) or (b2), and particularly preferred is (b1).

The amount of the above curing agent is preferably from 0.1 to 200 parts by weight, per 100 parts by weight of the phosphorus-containing acid material (a). In the case of the curing agent (b1), it also has a function as a blowing agent, and it is particularly preferably from 1 to 150 parts by weight, when the degree of curing and foaming is taken into consideration.

With respect to the blowing agent (c) in the foam of the present invention, depending upon the type of the above curing agent (b), no separate blowing agent is required to be used. Namely, in the case of (b1) and (3), (b1) and (b3) have also a function as a blowing agent (c). Whereas, (b2) has only a function as a curing agent, and it requires a blowing agent (c). As such a blowing agent (c), a low boiling point organic solvent, or an organic compound which generates a gas by heat decomposition, may be mentioned.

The above volatile low boiling point (the boiling point being preferably at most 120° C.) organic solvent, may, for example, be an ether, a ketone, a hydrocarbon or a halogenated hydrocarbon. These blowing agents may be used alone or in combination as a mixture of two or more of them.

A preferred example of the above ether is diethyl ether or dipropyl ether, and a preferred example of the ketone is acetone or methyl ethyl ketone. A preferred example of the above hydrocarbon is pentane, hexane, heptane, cyclopentane or cyclohexane. A preferred example of the above halogenated hydrocarbon is one having a boiling point of from 0 to 100° C., including a chlorinated hydrocarbon such as methylene chloride or trichloroethylene, a chlorinated fluorohydrocarbon such as 2,2-dichloro-1,1,1-trifluoroethane (HCFC123) or 1,1-dichloro-1-fluoroethane (HCFC141b), or a fluorinated hydrocarbon such as 1,1,1,2,3,3-hexafluoropropane (HFC236ea) or 1,1,1,3,3-pentafluoropropane (HFC245fa).

A preferred example of the above-mentioned organic compound which generates a gas by thermal decomposition, is an azo type compound such as azobisisobutyronitrile, azodicarbonamide or azobisformaldehyde; a nitrous compound such as dinitrosopentamethylenetetramine or dinitrosoterephthalamide; a sulfonyl hydrazide compound such as p-toluene sulfonyl hydrazide or P,P'-oxybis(benzene sulfonyl hydrazide); an organic peroxide such as methyl ethyl ketone peroxide, benzoyl peroxide or cumene peroxide; or a hydrazo type compound such as hydrazo dicarbonamide, isopropyl hydrazo dicarboxylate, tolylhydrazinotriamine or p-toluene sulfonylsemicarbazide. Further, 5-phenyltetrazol, ammonium carbonate, ammonium hydrogencarbonate or a compound such as urea, may be used. As the blowing agent (c), a halogenated hydrocarbon having a boiling point of from 0 to 100° C. or acetone may preferably be mentioned.

In the present invention, the amount of the blowing agent (c) is usually at most 55 parts by weight, preferably from 0.5 to 50 parts by weight, particularly preferably from 5 to 45 parts by weight, per 100 parts by weight of the phosphorus-containing acid material (a). When (b2) is used as a curing agent, a blowing agent is separately employed. Accordingly, by properly selecting the blowing agent to the curing agent, the foaming time for the curing reaction can suitably be adjusted, and filling of the foam to the honeycomb body will be sufficient. Further, the amounts of the curing agent and the blowing agent may be respectively adjusted, whereby it is easy to adjust the desired hardness within a wide range of from soft to hard depending upon the foaming ratio.

In the present invention, the urethane prepolymer having NCO groups (d) may be one which is derived from an organic polyisocyanate compound (n) and an active hydrogen-containing compound (h) and which has NCO groups in its molecule. As such an organic polyisocyanate compound (n), the following (n1) to (n5) may, for example, be mentioned. Here, the carbon number in (n1) to (n5) is a value excluding the carbon number in the NCO groups.

(n1) a $C_{2-12}$ aliphatic polyisocyanate,
(n2) a $C_{4-15}$ alicyclic polyisocyanate,
(n3) a $C_{8-12}$ araliphatic polyisocyanate,
(n4) a $C_{6-20}$ aromatic polyisocyanate,
(n5) a modified product of a polyisocyanate (n1) to (n4).

Specific examples of the aliphatic polyisocyanate (n1) include:
ethylene diisocyanate,
tetramethylene diisocyanate,
hexamethylene diisocyanate (HDI),
dodecamethylene diisocyanate,
2,2,4-trimethylhexamethylene diisocyanate,
lysine diisocyanate, and
1,3,6-hexamethylene triisocyanate.

Specific examples of the alicyclic polyisocyanate (n2) include:
isophorone diisocyanate (IPDI),
dicyclohexylmethane-4-4'-diisocyanate (hydrogenated MDI),
1,4-cyclohexane diisocyanate,
methylcyclohexane-2,4-diisocyanate (hydrogenated TDI), and
1,4-bis(2-isocyanate ethyl)cyclohexane, and the like.

Specific examples of the araliphatic polyisocyanate (n3) include:
p-xylene diisocyanate, and
tetramethylxylene diisocyanate, and the like.

Specific examples of the aromatic polyisocyanate (n4) include:
1,4-phenylene diisocyanate
2,4- or 2,6-toluene diisocyanate (TDI),
diphenylmethane-2,4'- or 4,4'-diisocyanate (MDI),
naphthalene-1,5-diisocyanate,
3,3'-dimethyldiphenylmethane-4,4'-diisocyanate, crude TDI, and
polyphenylmethane polyisocyanate [common name is crude MDI: a phosgenated product of a condensate of an aromatic amine such as aniline or its mixture with formaldehyde (a mixture comprising diaminodiphenyl methane and a small amount, such as from 1 to 20 wt %, of a polyamine having at least three amino groups)].

Specific examples of the modified product (n5) of a polyisocyanate (n1) to (n4) include modified products having carbon amide groups, uretidion groups, uretoimine groups, urea groups, beaulet groups, isocyanurate groups, urethane groups, etc., introduced in place of the isocyanate groups of the polyisocyanates exemplified above as (n1) to (n4).

Selection of such organic polyisocyanate compounds (n) is not particularly limited, and they may be used alone or in an optional combination as a component to produce a polyurethane polymer depending upon the physical properties of the foam and costs. Among them, HDI, IPDI, hydrogenated MDI, hydrogenated TDI, TDI or MDI is preferred, and particularly preferred is IPDI, TDI or MDI.

The above active hydrogen-containing compound (h) may, for example, be a low molecular weight polyol (h1) and a high molecular weight polyol (h2). Here, if the range of the molecular weight of each of (h1) and (h2) is represented by the hydroxyl group value, the hydroxyl group value of (h1) is usually from 300 to 1,000 or higher, preferably from 350 to 800. Further, the hydroxyl group value of (h2) is usually less than 300, preferably from 20 to 250, particularly preferably from 40 to 200. Further, the number of functional groups of the active hydrogen-containing compound (h) is usually from 2 to 8 or higher in the case of either (h1) or (h2).

As the low molecular weight polyol (h1), the following (h1-1) to (h1-6) may be mentioned.
(h1-1) an aliphatic dihydric alcohol
(h1-2) a low molecular weight diol having a cyclic group
(h1-3) a trihydric alcohol
(h1-4) a tetrahydric to octahydric or higher polyhydric alcohol (h1-5) an alkanolamine (h1-6) a low mol ethylene oxide and/or propylene oxide adduct of a compound of (h1-1) to (h1-5).

On the other hand, as the high molecular weight polyol (h2), the following (h2-1) to (h2-6) may be mentioned.

(h2-1) a polyoxyalkylene polyol (h2-2) a polyester polyol (h2-3) a polyolefin polyol (h2-4) an acryl polyol (h2-5) a castor oil polyol (h2-6) a polymer polyol.

Among the low molecular weight polyols (h1), specific examples of the aliphatic dihydric alcohol (h1-1) include ethylene glycol, diethylene glycol, propylene glycol, dipropylene glycol, 1,4-butanediol, neopentyl glycol, 1,6-hexanediol or 1,8-octamethylenediol, and the like. Specific examples of the low molecular weight diol (h1-2) having a cyclic group include 1,4-bis(2-hydroxyethoxyphenyl) propane. Specific examples of the trihydric alcohol (h1-3) include glycerol, trimethylol propane and hexane triol. Specific examples of the tetrafunctional or higher polyhydric alcohol (h1-4) include sorbitol and sucrose. Specific examples of the alkanolamine (h1-5) include triethanolamine and methyldiethanolamine. Specific examples of the above low mol adduct (h1-6) include those having ethylene oxide and/or propylene oxide added in a low mol within a range such that the hydroxyl value will be at least 300, to ones mentioned as specific examples of such (h1-1) to (h1-5).

On the other hand, among the high molecular weight polyols (h2), the polyoxyalkylene polyol (h2-1) may, for example, be one having an alkylene oxide added to a compound of (h1-1) to (h1-5) described in the paragraph for the low molecular weight polyol (h1), to a low molecular amine or to a polyhydric phenol. The low molecular amine may, for example, be a low molecular polyamine such as ethylenediamine, tetramethylenediamine or hexamethylenediamine, or a low molecular monoamine such as n-butylamine or stearyl amine. The polyhydric phenol may, for example, be hydroquinone, bisphenol A, bisphenol F or bisphenol S. As the alkylene oxide to be added, a $C_{2-4}$ alkylene oxide such as ethylene oxide, propylene oxide or butylene oxide, or a combination thereof (in the case of the combination, it may be a block or random adduct) may, for example, be mentioned. Specific examples of the polyoxyalkylene polyol (h2-1) include polyoxypropylene glycol, polyoxypropylene triol, polyoxyethylene polyoxypropylene glycol, polyoxyethylene polyoxypropylene triol, polyoxypropylene tetraol and polyoxytetramethylene glycol.

The polyester polyol (h2-2) may, for example, be the following (h2-21) to (h2-23).

(h2-21) a condensed polyester polyol obtained by reacting a two or higher functional polyhydric alcohol with a dicarboxylic acid.

(h2-22) a polylactone polyol obtained by ring opening polymerization of a lactone (h2-23) a polycarbonate polyol obtained by the reaction of ethylene carbonate with 1,6-hexanediol.

The dicarboxylic acid which constitutes the condensed polyester polyol (h2-21) may, for example, be a $C_{2-20}$ aliphatic dicarboxylic acid (such as succinic acid, adipic acid, sebacic acid, glutaric acid, azelaic acid, maleic acid or fumaric acid), a $C_{8-24}$ aromatic dicarboxylic acid (such as terephthalic acid or isophthalic acid), and anhydride, a lower alkyl (carbon number 1 to 4) ester or an acid halide (such as acid chloride) of such a dicarboxylic acid, or a mixture of two or more of them. The lactone to be used for the polylactone polyol (h2-22) may, for example, be ε-caprolactone.

Specific examples of such a polyester polyol (h2-2) include polyethylene adipate, polybutylene adipate, polyhexamethylene adipate, polyneopentyl adipate, polyethylenepolypropylene adipate, polyethylene butylene adipate, polybutylene hexanemethylene adipate, polydiethylene adipate, poly(polytetramethylenether) adipate, polyethylene azelate, polyethylene sebacate, polybutylene azelate, polybutylene sebacate, polyethylene terephthalate, polycaprolactone diol and polycarbonate diol.

Specific examples of the polyolefin polyol (h2-3) include polybutadiene polyol, hydrogenated polybutadiene polyol and polyisoprene polyol. Specific examples of the acryl polyol (h2-4) include a copolymer of hydroxyethyl acrylate with ethyl acrylate, and a copolymer of hydroxyethyl acrylate, ethyl acrylate and styrene. The castor oil type polyol (h2-5) may, for example, be (h2-51) castor oil; (h2-52) a polyester polyol of a castor oil fatty acid with a polyhydric alcohol or a polyoxyalkylene polyol; or a mixture of two or more of them. Specific examples of (h2-52) include a mono-, di- or tri-ester of a castor oil fatty acid with trimethylolpropane; and a mono- or di-ester of a castor oil fatty acid with polyoxypropylene glycol.

The polymer polyol (h2-6) may, for example, be one obtainable by polymerizing an ethylenically unsaturated monomer disclosed in U.S. Pat. No. 3,383,351 such as acrylonitrile or styrene among high molecular weight polyols exemplified as (h2-1) to (h2-5). The content of the ethylenically unsaturated monomer unit constituting the polymer polyol (h2-6) is usually from 0.1 to 70 wt %, preferably from 5.0 to 60 wt %. As a method for producing the polymer polyol (h2-6), a method of polymerizing the ethylenically unsaturated monomer in a polyol in the presence of a polymerization initiator (such as a radical-generating agent) (such as the method disclosed in U.S. Pat. No. 3,383,351) may, for example, be mentioned.

Among those exemplified in the foregoing as the active hydrogen-containing compound (h), particularly preferred is an ethylene oxide adduct among polyoxyalkylene polyols (h2-1), and it is preferred to use the ethylene oxide adduct alone or as a part of the active hydrogen-containing compound (h). In such a case, the content of the oxyethylene units in the active hydrogen-containing compound (h) is preferably from 10 to 95 wt %, particularly preferably from 50 to 90 wt %. By using such an ethylene oxide adduct, the dispersibility of the prepolymer (d) at the time of preparing the aqueous mixture, will be improved.

The low molecular weight polyol (h1) and the high molecular weight polyol (h2) may be used alone, respectively, or may be used in combination, and the ratio of the low molecular weight polyol (h1) to the high molecular weight polyol (h2) is not particularly limited. For example, in order to improve the effect for overcoming the brittleness of the foam or in order to increase the effect for imparting the flexibility, the ratio of (h2) is preferably increased so that the weight ratio of (h1):(h2)=(0 to 50):(50 to 100). On the other hand, in order to increase the rigidity of the foam, the ratio of (h1) is preferably increased so that the weight ratio of (h1):(h2)=(50 to 100):(0 to 50).

Further, in order to adjust the molecular weight or viscosity of the prepolymer (d), a monool (h3) may be incorporated as component (h), as the case requires. The monool (h3) may, for example, be an aliphatic monohydric alcohol such as methanol, ethanol, isopropanol, butanol, pentanol, 2-ethylhexanol or dodecanol, or an alkylene oxide (such as ethylene oxide or propylene oxide) adduct of an alkylphenol (such as octyl phenol, nonyl phenol or dodecyl phenol). The hydroxyl value of the monool (h3) is usually within the same range as (h1) or (h2). The proportion of the monool (h3) to be used as the case requires, in the active hydrogen compound (h), is usually within a range wherein the average number of functional groups of (h) will be at least 2, preferably at least 2.5.

The NCO content in the above urethane prepolymer (d) is preferably from 0.5 to 30 wt %. Further, the nature of the urethane prepolymer (d) is preferably liquid at room temperature, and preferably has a molecular weight and a molecular composition of certain degrees. Its number average molecular weight by gel permeation chromatography is preferably from 1,000 to 50,000.

The urethane prepolymer (d) can be produced by charging the organic polyisocyanate and the active hydrogen-containing compound in a reactor and reacting them at a temperature of from 50 to 120° C. The content of the urethane prepolymer (d) units in the foam in the present invention, i.e. the content of (d) to the total solid content at the time of the preparation of the foam is preferably from 3 to 30 wt %, particularly preferably from 5 to 25 wt %. To the foam of the present invention, boric acid or a polyvalent metal borate may be incorporated in an amount of from 1 to 50 wt % in the foam in order to maintain the shape after incineration or in order to suppress heat generation or smoke generation.

To the foam of the present invention, an inorganic filler may be incorporated as the case requires, taking the physical properties and the cost into consideration. The inorganic filler may, for example, be a cement (such as portland cement or alumina cement), a clay mineral (such as monmorillonite or bentonite), an inorganic light weight aggregate (such as perlite or silas balloon), an inorganic fiber (such as rock wool or glass wool), fly ash, silica fume, silica powder, ceramic powder, aluminum hydroxide, alumina, calcium sulfate, or other water-insoluble inorganic powder material. Further, an organic fiber may also be incorporated in order to improve the tensile strength, the bending strength, etc., of the foam. The amount of such a material is not particularly limited, and it is usually at most 1,800 parts by weight, preferably from 10 to 500 parts by weight per 100 parts by weight of the phosphorus-containing acid material (a).

The foam of the present invention may be foamed and cured by an addition of a flame retardant in order to impart a still higher fire preventing property. Preferred examples of the flame retardant include a non-halogen phosphoric acid ester, a halogen-containing phosphoric acid ester, an active hydrogen-containing flame retardant, antimony trioxide, antimony pentoxide, and zinc oxide. These may be used in combination as a mixture of two or more of them. The amount of the flame retardant is preferably at most 40 parts by weight, particularly preferably from 0.1 to 30 parts by weight, per 100 parts by weight of the urethane prepolymer.

According to the present invention, the phosphorus-containing acid material (a), the curing agent (b), the prepolymer (d), water (e) and, if necessary, the blowing agent (c), are mixed to obtain an aqueous mixture, which is filled in cells of a honeycomb, followed by foaming and curing to obtain the honeycomb core material of the present invention. The amount of water in the aqueous mixture may be within a range where slurring is possible, and it is not necessary to add water more than necessary. If the water is large, it takes time and labor to dry the foamed and cured product. The amount of water is preferably such that the concentration of the solid content in the mixture will be from 50 to 90 wt %.

In the present invention, a catalyst may, for example, be used in order to control the curing speed of the prepolymer (d) to form the organic foam. Preferred examples of such a catalyst include a metal type catalyst such as dibutyltin dilaurate, an alkyl titanate, an organic silicon titanate, stanous octoate, lead octylate, zinc octylate, bismuth octylate, dibutyltin diorthophenylphenoxite, a reaction product of tin oxide with an ester compound (such as dioctyl phthalate), and an amine type catalyst such as a monoamine (such as triethylamine), a diamine (such as N,N,N',N'-tetramethylethylenediamine), a triamine (such as N,N,N',N", N"-pentamethyldiethylenetriamine), or a cyclic amine (such as triethylenediamine). The amount of the catalyst is usually at most 7 parts by weight, preferably from 0.001 to 5 parts by weight, per 100 parts by weight of the prepolymer (d).

Further, in the present invention, a foam stabilizer may be employed in order to control the cell structure of the foam to be formed. As a preferred example of such a foam stabilizer, the silicon type surfactant may be mentioned. For example, "SH-192", "SH-193" or "SH-194", manufactured by Dow Corning Toray Silicon Co., Ltd., "TFA-4200", manufactured by Toshiba Silicons, "L-5320", "L-5340" or "L-5350", manufactured by Nippon Unicar Company Limited, and "F-121" or "F-122", manufactured by Shin-Etsu Chemical Co., Ltd., may be mentioned. The amount of the foam stabilizer is usually at most 2 parts by weight, preferably from 0.001 to 1 part by weight, per 100 parts by weight of the urethane prepolymer.

In the present invention, a preferred specific method of preparing the above aqueous mixture and foaming and curing it in cells of a honeycomb, is as follows. The aqueous mixture may be prepared by mixing the phosphorus-containing acid material (a), the curing agent (b), the prepolymer (d), water (e) and the blowing agent (c) which is used as the case requires, and the inorganic filler all at once. Otherwise, it may be prepared by mixing the phosphorus-containing acid material (a) or its aqueous solution and the prepolymer (d) and then mixing the curing agent (b), and the blowing agent (c) which may be used as the case requires, and the inorganic filler, separately, or preliminarily mixing them to form a slurry, which is then mixed.

A method of filling the above aqueous mixture in cells of a honeycomb body, is not particularly limited, and a method of introducing a slurry-form aqueous mixture into cells, a filling method by spraying, or a method of smoothing the aqueous mixture in a flat shape, and then pressing a honeycomb body from above to fill it, may, for example, be mentioned. In such a method, it is preferred that after filling the aqueous mixture in the honeycomb body, a flat smooth face member is put on the filled honeycomb body face to sufficiently fix it, whereby it is possible to prevent swelling of the foam out of the cells of the honeycomb body. Further, the aqueous mixture may not necessarily be filled in all cells of the honeycomb body or in entire cells. Thus, it is possible to produce a honeycomb core material having the foam filled in a part of cells along the thickness direction of the honeycomb body. The filling ratio of the above aqueous mixture in cells of the honeycomb body is usually at least 20 vol %, preferably from 30 to 100 vol %.

The above aqueous mixture is filled in cells of the honeycomb body and then preferably foamed for a few second to a few tens minutes under ordinary temperature and ordinary pressure conditions, and then curing is completed to form a foam. However, in a case where the temperature is low during the winter, or in a case where it is desired to shorten the foaming and curing time from the viewpoint of the process, it may be heated to a level of 50° C. while being left to stand still. Thereafter, it may be heated to a temperature of from 80 to 100° C., as the case requires, to remove excess water.

The inorganic and organic composite foam of the present invention thus produced, has excellent characteristics as described above. Particularly by controlling the amounts of the polyvalent metal carbonate (b1), the light metal (b3) and the blowing agent (c) contained in the above aqueous mixture, its specific gravity can be adjusted within a wide range of from 0.01 to 1.5. Especially, with the composite foam of the present invention, if the specific gravity is low at a level of 0.1 or lower, the flexibility of the foam will be intensely developed, and consequently, the obtainable honeycomb core material will have flexibility.

Thus, in the present invention, it is possible to obtain a honeycomb core material having a composite foam of a wide range of material ranging from a hard material to a soft material. Further, in the present invention, the thermal insulating performance of the obtained honeycomb core material may be adjusted by selecting the material of the honeycomb body and controlling the composition of the above aqueous mixture, particularly by controlling the specific gravity, for example, to impart a low thermal conductivity of a level of at most 0.04 kcal/m·hr·° C., and the fire preventing property is also corresponding to the level of non-combustible to semi-non-combustible material.

As the surface materials to be bonded to the honeycomb core material in the present invention, metal plates may, for example, be steel plates, aluminum alloy plates, stainless steel plates or titanium alloy plates; wood plates may, for example, be plywood plates, particle boards, MDF (medium fiber plates), lauan or cryptomeria boards; and plastic plates may be FRP plates, vinyl chloride plates, acrylic plates, or foams of relatively hardly inflammable resin such as polyurethane, polystyrene, polyethylene, phenol, melamine or urea resin. Further, inorganic plates may, for example, be gypsum plates, slate plates, calcium silicate plates, tiles or ceramic plates; and natural stone plates may, for example, be marble, granite, limestone or travertine. Further, to such surface materials, one or more treatments such as coating, plating, lining with a facing material, resin dressing or coating, primer treatment, rust preventive treatment, antibacterial treatment, and antifungal treatment, may be applied, as the case requires.

From the viewpoint of the fire resistance, flame retardancy, strength and ornamental appearance, the above steel plates, may, for example, be colored steel plates, galvanium steel plates, bonde steel plates or zing plated steel plates. The above aluminum alloy plates may, for example, be Al—Mg type alloy 5000 type of non-heat treated alloy (corrosion resistant aluminum alloy), Al,Cu,Mg type alloy 2000 type of heat-treated alloy (high power aluminum alloy), Al,Mg,Si type alloy 6000 type, or Al,Zn,Mg type alloy 7000 type. The stainless steel plates may, for example, be SUS430, or SUS 304. These metal plates and titanium alloy plates are preferably employed. Further, the above-mentioned inorganic plates and natural stone plates are suitable. Further, as the plastic plates, those obtained by foaming a relatively hardly inflammable resin such as the above-mentioned phenol, melamine or urea resin, are suitable, and flame retardant boards having them reinforced with an inorganic fiber, are preferred.

Further, in the case of bonding the surface materials to the honeycomb core material, an adhesive or a solder may be employed, or a method such as diffusion bonding, may be employed. Among them, a method of using an adhesive is common. The adhesive may, for example, be a thermosetting type adhesive such as an epoxy type, urethane type or vinyl phenolic type, or a thermoplastic adhesive such as a synthetic rubber type or vinyl acetate type. Its formulation may be in the form of a solution, a paste, a solid or a film. Such an adhesive is selected suitably depending upon the material of the surface materials and the honeycomb body, the adhesive strength, the curing conditions, the bonding installation, the durability, the cost, etc. Further, the bonding method may, for example, be a turn back method, a pinch roller method, a hot press method, a vacuum back method or an autoclave method. These methods may be employed alone or in combination. Further, to the bonding surface of the surface materials to be bonded, primer treatment or degreasing treatment, and treatment to roughen the bonding surface such as sanding, may be applied depending upon the adhesive.

Now, the present invention will be described in further detail with reference to Examples. However, it should be understood that the interpretation of the present invention is by no means restricted by such Examples.

EXAMPLE 1

A 50 wt % aqueous solution of magnesium primary phosphate (a-1) put in a tank A, a TDI prepolymer (d-1) put in a tank D flashed with nitrogen to avoid a reaction with moisture in air, and basic magnesium carbonate (b-1) put in a tank B, were prepared. From the above respective tanks, firstly, (a-1) and (d-1) were withdrawn so that (a-1)/(d-1) would be 50 parts by weight/5 parts by weight, and mixed and stirred by a spiral pin mixer. Immediately thereafter, (b-1) was added in an amount of 30 parts by weight by a vibration feeder, followed by further mixing.

The TDI prepolymer (d-1) used in this Example 1 and in the following Examples, represents the following. To 100 parts by weight of TDI-80 [Colonate T-80, tradename, manufactured by Nippon Polyurethane Industry Co., Ltd.], 420 parts by weight of polyoxyethylene polyoxypropylene glycol [molecular weight: 2188, a block copolymer comprising 60 wt % of ethylene oxide and 40 wt % of propylene oxide] was reacted to obtain the prepolymer. The prepolymer had a NCO content of 6.2 wt % and a number average molecular weight of 1,355 and was a viscous resin solution at room temperature.

The obtained slurry-form aqueous mixture was discharged on a PET (polyethylene terephthalate) film from a discharge outlet of the spiral pin mixer (manufactured by Pacific Machinery & Engineering Co., Ltd.) so that the thickness would be flat and smooth, and transferred onto a belt press. The coated amount at that time was 1.50 kg/m$^2$.

Further, a separately prepared flame retardant paper honeycomb body having a cell size of 17 mm, a porosity of 95.3% and a thickness of 40 mm and containing magnesium silicate in an amount of 77 wt % of the total weight, was placed above the aqueous mixture and retained for 3 minutes in a state pressed by a belt press.

During the retention by the belt press, foaming and curing of the above aqueous mixture completed, and the formed foam occupied about 80% of the thickness of the honeycomb. Thereafter, excess water was evaporated by heating and drying at 90° C. for two hours. The weight of the obtained honeycomb core material was 2.0 kg/m$^2$.

EXAMPLE 2

In the same manner as in Example 1, a 50 wt % aqueous solution of magnesium primary phosphate (a-1) put in a tank A, and a TDI prepolymer (d-1) put in a tank D flashed with nitrogen to avoid a reaction with moisture in air, were prepared, and magnesium oxide (b-2) put in a tank B, and acetone (c-1) put in a tank C, were prepared. From the above respective tanks, firstly, (a-1) and (d-1) were withdrawn so that (a-1)/(d-1) would be 50 parts by weight/5 parts by weight, and mixed and stirred by a spiral pin mixer. Immediately thereafter, 10 parts by weight of (c-1) and 40 parts by weight of (b-2) were added by a vibration feeder, followed by further mixing.

The obtained slurry-form aqueous mixture was discharged on a PET film from a discharge outlet of the spiral pin mixer so that the thickness would be flat and smooth, and transferred onto a belt press. The coated amount at that time was 1.68 kg/m$^2$.

Further, a separately prepared paper honeycomb body which was the same as in Example 1, was placed from above the aqueous mixture and retained for 3 minutes in a state pressed by a belt press. During the retention by the belt press, foaming and curing of the above aqueous mixture completed, and the formed foam occupied about 70% of the thickness of the honeycomb. Thereafter, excess water was evaporated by heating and drying at 90° C. for two hours. The weight of the obtained honeycomb core material was 2.1 kg/m$^2$.

EXAMPLE 3

In the same manner as in Example 1, a TDI prepolymer (d-1) put in a tank D flashed with nitrogen to avoid a reaction with moisture in air, and basic magnesium carbonate (b-1) put in a tank B, were prepared, except that a salt (a-2) prepared by mixing a 50 wt % aqueous solution of magnesium primary phosphate and triethylamine in a weight ratio of 19:1 and put in a tank A, was prepared. From the above respective tanks, firstly, (a-2) and (d-1) were withdrawn so that (a-2)/(d-1) would be 53 parts by weight/5 parts by weight, and mixed and stirred by a spiral pin mixer. Immediately thereafter, (b-1) was added in an amount of 30 parts by weight, by a vibration feeder, followed by further mixing.

The obtained slurry-form aqueous mixture was discharged on a PET (polyethylene terephthalate) film from a discharge outlet of the spiral pin mixer, and after making the thickness sufficiently uniform by means of a doctor blade, transferred onto a belt press. The coated amount at that time was 1.55 kg/m$^2$.

Further, a separately prepared paper honeycomb body which was the same as in Example 1, was placed from above the aqueous mixture and retained for 3 minutes in a state pressed by a belt press. During the retention by the belt press, foaming and curing of the above aqueous mixture completed, and the formed foam was uniform in the amount filled in each honeycomb cell and occupied about 70% of the thickness of the honeycomb. With this honeycomb core material, the foaming speed was lowered, so that the above aqueous mixture was maintained in a non-foamed state i.e. the time having fluidity was prolonged, whereby it was possible to make the thickness sufficiently uniform, and as a result, the amount filled in each honeycomb cell was uniform. Thereafter, excess water was evaporated by heating and drying at 90° C. for two hours. The weight of the obtained honeycomb core material was 2.0 kg/m$^2$.

EXAMPLE 4

Filling in the honeycomb body was carried out in the same manner except that the triethylamine in Example 3 was changed to urea, and a 50 wt % aqueous solution of magnesium primary phosphate and urea were mixed in a weight ratio of 99:1. The formed foam was uniform in the amount filled in each honeycomb cell and occupied about 70% of the thickness of the honeycomb. With this honeycomb core material, the foaming speed was lowered, so that the above aqueous mixture was maintained in a non-foamed state i.e. the time having fluidity was prolonged, whereby it was possible to make the thickness sufficiently uniform, and as a result, the amount filled in each honeycomb cell was uniform. Thereafter, excess water was evaporated by heating and drying at 90° C. for two hours. The weight of the obtained honeycomb core material was 2.1 kg/m$^2$.

EXAMPLE 5

Between a semicylindrical convex die having a diameter of 600 mm and a half pipe-form concave die having a diameter of 640 mm, a color steel plate having a thickness of 0.5 mm and having a two-component room temperature curable epoxy type adhesive coated on one side for a honeycomb core material, was placed, and the honeycomb core material prepared in Example 1 was placed thereon. Further, a color steel plate having a two-pack room temperature curable epoxy type adhesive coated on one side in the same manner was placed thereon, whereupon the dies were closed and left to stand at room temperature for 24 hours to let the adhesive cure, thereby to obtain a sandwich panel having a curved surface. At that time, the honeycomb core material was free from cracking or free from falling off from the foam, and its adhesion to the steel plates was perfect.

EXAMPLE 6

In the same manner as in Example 3, a salt (a-2) prepared by mixing a 50 wt % aqueous solution of magnesium primary phosphate and triethylamine in a weight ratio of 19:1 and put in a tank A, a TDI prepolymer (d-1) put in a tank D flashed with nitrogen to avoid a reaction with moisture in air, and basic magnesium carbonate (b-1) put in a tank B, were prepared. From the above respective tanks, firstly, (a-2) and (d-1) were withdrawn so that (a-2)/(d-1) would be 53 parts by weight/5 parts by weight, and mixed and stirred by a spiral pin mixer. Immediately thereafter, (b-1) was added in an amount of 30 parts by weight by a vibration feeder, followed by further mixing.

The obtained slurry-form aqueous mixture was discharged on a PET film from a discharge outlet of the spiral pin mixer, so that the thickness would be smooth and flat and transferred onto a belt press. The coated amount at that time was 1.52 kg/m$^2$.

Further, a separately prepared a flame retardant paper honeycomb body having a cell size of 19 mm, a porosity of 96.0% and thickness of 40 mm and containing aluminum hydroxide in an amount of 47 wt % of the total weight and rock wool in an amount of 24 wt %, was placed from above the aqueous mixture and retained for 3 minutes in a state pressed by the belt press.

During the retention by the belt press, foaming and curing of the above aqueous mixture completed, and the formed foam occupied about 90% of the thickness of the honeycomb. Thereafter, excess water was evaporated by heating and drying at 90° C. for two hours. The weight of the obtained honeycomb core material was 2.2 kg/m$^2$.

EXAMPLE 7

In the same manner as in Example 3, a salt (a-2) prepared by mixing a 50 wt % aqueous solution of magnesium primary phosphate and triethylamine in a weight ratio of 19:1 and put in a tank A, a TDI prepolymer (d-1) put in a tank D flashed with nitrogen to avoid a reaction with moisture in air, and basic magnesium carbonate (b-1) put in a tank B, were prepared. From the above respective tanks, firstly, (a-2) and (d-1) were withdrawn so that (a-2)/(d-1) would be 53 parts by weight/S parts by weight, and mixed and stirred by a spiral pin mixer. Immediately thereafter, (b-1) was added in an amount of 30 parts by weight by a vibration feeder, followed by further mixing.

The obtained slurry-form aqueous mixture was discharged on a PET film from a discharge outlet of the spiral pin mixer, so that the thickness would be smooth and flat and transferred onto a belt press. The coated amount at that time was 1.52 kg/$^2$.

Further, a separately prepared a craft paper honeycomb body having a cell size of 19 mm, a porosity of 95.8% and a thickness of 40 mm, was placed from above the aqueous mixture and retained for 3 minutes in a state pressed by the belt press.

During the retention by the belt press, foaming and curing of the above aqueous mixture completed, and the formed foam occupied about 90% of the thickness of the honeycomb. Thereafter, excess water was evaporated by heating and drying at 90° C. for two hours. The weight of the obtained honeycomb core material was 2.1 kg /m$^2$.

EXAMPLE 8

In the same manner as in Example 3, a salt (a-2) prepared by mixing a 50 wt % aqueous solution of magnesium primary phosphate and triethylamine in a weight ratio of 19:1 and put in a tank A, a TDI prepolymer (d-1) put in a tank D flashed with nitrogen to avoid a reaction with moisture in air, and basic magnesium carbonate (b-1) put in a tank B, were prepared. From the above respective tanks, firstly, (a-2) and (d-1) were withdrawn so that (a-2)/(d-1) would be 53 parts by weight/5 parts by weight, and mixed and stirred by a spiral pin mixer. Immediately thereafter, (b-1) was added in an amount of 30 parts by weight by a vibration feeder, followed by further mixing.

The obtained slurry-form aqueous mixture was discharged on a PET film from a discharge outlet of the spiral pin mixer, so that the thickness would be smooth and flat and transferred onto a belt press. The coated amount at that time was 1.50 kg/m$^2$.

Further, a separately prepared aluminum honeycomb body having a cell size of 9.5 mm, a porosity of 98.2% and a thickness of 40 mm, was placed from above the aqueous mixture, and retained for 3 minutes in a state pressed by the belt press.

During the retention by the belt press, foaming and curing of the above aqueous mixture completed, and the formed foam occupied about 90% of the thickness of the honeycomb. Thereafter, excess water was evaporated by heating and drying at 90° C. for two hours. The weight of the obtained honeycomb core material was 2.4 kg/m$^2$.

COMPARATIVE EXAMPLE 1

A 50 wt % aqueous solution of magnesium primary phosphate (a-1) put in a tank A and basic magnesium carbonate (b-1) put in a tank B, were prepared. 30 Parts by weight of (b-1) was added to 50 parts by weight of (a-1), from the respective tanks, followed by mixing by a spiral pin mixer.

The obtained slurry-form aqueous mixture was discharged on a PET film from a discharge outlet of the spiral pin mixer, so that the thickness would be smooth and flat, and transferred onto a belt press. The coated amount at that time was 1.50 kg/m$^2$.

Further, a separately prepared paper honeycomb body which was the same as in Example 1, was put from above the aqueous mixture and retained for 3 minutes in a state pressed by the belt press.

During the retention by the belt press, foaming and curing of the above aqueous mixture completed, and the formed foam occupied about 50% of the thickness of the honeycomb. Thereafter, excess water was evaporated by heating and drying at 90° C. for two hours. The weight of the obtained honeycomb core material was 2.2 kg/m$^2$.

COMPARATIVE EXAMPLE 2

A 50 wt % aqueous solution of magnesium primary phosphate (a-1) put in a tank A, magnesium oxide (d-2) put in a tank B, and acetone (c-1) put in a tank C, were prepared. 10 Parts by weight of (c-1) and 40 parts by weight of (b-2) were added to 50 parts by weight of (a-1), from the above respective tanks, followed by mixing by a spiral pin mixer.

The obtained slurry-form aqueous mixture was discharged on a PET film from a discharge outlet of the spiral pin mixer, so that the thickness would be smooth and flat and transferred onto a belt press. The coated amount at that time was 1.53 kg/r$^2$.

Further, a separately prepared a paper honeycomb body which was the same as in Example 1, was put from above the aqueous mixture, and retained for 3 minutes in a state pressed by the belt press.

During the retention by the belt press, foaming and curing of the above aqueous mixture completed, and the formed foam occupied about 40% of the thickness of the honeycomb. Thereafter, excess water was evaporated by heating and drying at 90° C. for two hours. The weight of the obtained honeycomb core material was 2.2 kg/m$^2$.

COMPARATIVE EXAMPLE 3

In the same manner as in Example 1, a 50 wt % aqueous solution of magnesium primary phosphate (a-1) put in a tank A, a TDI prepolymer (d-1) put in a tank D flashed with nitrogen to avoid a reaction with moisture in air, and basic magnesium carbonate (d-1) put in a tank D, were prepared. From the above respective tanks, firstly, (a-1) and (d-1) were withdrawn so that (a-1)/(d-1) would be 50 parts by weight/5 parts by weight, and mixed and stirred by a spiral pin mixer. Immediately thereafter, (b-1) was added in an amount of 30 parts by weight by a vibration feeder, followed by further mixing.

The obtained slurry-form aqueous mixture was discharged on a PET film from a discharge outlet of the spiral pin mixer, so that the thickness would be smooth and flat and transferred onto a belt press. The coated amount at that time was 1.50 kg/m$^2$.

Further, cells of a paper honeycomb body having a cell size of 16 mm, a porosity of 95.3% and thickness of 40 mm and containing 77 wt % of magnesium silicate, were partially cut off to prepare a honeycomb body having a cell size of 120 mm and a porosity of 98.3%. Such a honeycomb body was placed from above the aqueous mixture, and retained for 3 minutes in a state pressed by the belt press.

During the retention by the belt press, foaming and curing of the above aqueous mixture completed, and the formed foam occupied about 80% of the thickness of the honeycomb. Thereafter, excess water was evaporated by heating and drying at 90° C. for two hours. The weight of the obtained honeycomb core material was 1.4 kg/m².

COMPARATIVE EXAMPLE 4

Parts by weight of a novolac type solid phenol resin, 10 parts by weight of hexamethylenetetramine and 5 parts by weight of dinitrosopentamethylenetetramine were kneaded by a metal roll, followed by pulverization to obtain a powder material for a foam, of from 50 to 150 mesh. Such a powder material was applied on a PET film in a size of 60 cm×90 cm in an amount of 1.2 kg/m², and sandwiched with another PET film, followed by heat pressing at 120° C. for 5 minutes and then by cooling to room temperature. The powder material was once plasticized by heating, and became a plate state when further cooled.

Further, a separately prepared paper honeycomb body which was the same as in Example 1, was placed from above a plate-form material having a PET film on one side peeled, followed by heat pressing at 160° C. for 60 minutes and then by cooling to room temperature. The formed phenol foam occupied about 80% of the thickness of the honeycomb. The weight of the obtained honeycomb core material was 2.3 kg/m².

COMPARATIVE EXAMPLE 5

In the same manner as in Example 5, between a semicylindrical convex die having a diameter of 600 mm and a half pipe-form concave die having a diameter of 640 mm, a color steel plate having a thickness of 0.5 mm and having a two-pack room temperature curable epoxy type adhesive coated on one side for a honeycomb core material, was placed, and the honeycomb core material prepared in Comparative Example 1 was placed thereon. Further, a color steel plate having a two-pack room temperature curable epoxy type adhesive coated on one side in the same manner was placed thereon, whereupon the dies were closed and left to stand at room temperature for 24 hours to let the adhesive cure thereby to obtain a sandwich panel having a curved surface.

The foam peeled from the honeycomb partition walls, and further, cracking of the honeycomb was observed on the concave side of the honeycomb core material. Further, on the convex side, the foam broken by warping of the honeycomb core material was sandwiched between the honeycomb and the steel plate, and peeling of the steel plate was observed.

COMPARATIVE EXAMPLE 6

The same magnesium silicate-containing paper honeycomb as used in Examples 1 to 4 and in Comparative Examples 1, 2 and 4, was used by itself as a core material.

COMPARATIVE EXAMPLE 7

The same aluminum hydroxide-containing paper honeycomb as used in Example 6, was used by itself as a core material.

COMPARATIVE EXAMPLE 8

The same craft paper honeycomb as used in Example 7, was used by itself as a core material.

With respect to the honeycomb core materials obtained in the above Examples and Comparative Examples (excluding Example 5 and Comparative Example 5), (1) flexibility of the honeycomb core material, (2) slipping off of the filler of the honeycomb core material, (3) the thermal conductivity of the honeycomb core material, (4) the non-flammability of the honeycomb core material, and (5) the compression strength of the sandwich panel, were tested. The results are shown in the attached Tables 1 and 2. The test methods for the above items are as follows.

(1) Flexibility of the Honeycomb Core Material

The honeycomb core material was cut into a size of 600×300 (provided that the longitudinal direction was the expansion direction of the honeycomb body) and supported at two points with a span of 500 mm (provided that the aqueous mixture coated side during the preparation faced downwardly), whereby the deflection at the center portion was measured.

(2) Slipping off of the Filler of the Honeycomb Core Material

The above test table supported at two points was vibrated at a vibration amplitude of 10 mm at 100 Hz for 3 minutes, whereupon slipping off and displacement of the filler was visually evaluated.

(3) Thermal Conductivity of the Honeycomb Core Material

Measured by JIS A1412.

(4) Non-flammability of the Honeycomb Core Material

The maximum ultimate temperature in the Non-combustibility test stipulated in Notice No. 1828 by Ministry of Construction, Japan, in 1970.

(5) Compression Strength of the Sandwich Panel

The sandwich panel having color steel plates of 0.8 mm bonded on both sides of the honeycomb core material by an epoxy type adhesive, was measured in accordance with JIS K9511.

INDUSTRIAL APPLICABILITY

The honeycomb core material according to the present invention is excellent in flame retardation and non-flammability, which can not be attained by a conventional organic foam, and is flexible and has elasticity, which can not be obtained by a conventional inorganic foam, since the filler in its cells is the above-mentioned inorganic and organic composite foam.

In addition, it has an extremely high adhesion between the honeycomb and the filler, whereby it is free from slipping off of the filler from the honeycomb body, and transportation and handling are easy.

Further, the foam has flexibility, and modification after the preparation is possible, whereby attachment of a flat surface material is good, and a honeycomb core material suitable also for a structure having a curved surface, can be provided.

Further, a method for producing a honeycomb core material is provided, wherein in cells of a honeycomb body, a aqueous mixture comprising a phosphorus-containing acid material, a curing agent, a blowing agent and a urethane polymer having NCO groups, is foamed and cured substantially simultaneously to form the above-mentioned composite foam comprising an inorganic foam and an organic foam.

Further, a method for producing a honeycomb core material is also provided wherein foaming and curing are suppressed before filling of the above aqueous mixture into cells of the honeycomb body, and the composite foam is uniformly formed in the cells of the honeycomb body.

TABLE 1

|  | Ex. 1 | Ex. 2 | Ex. 3 | Ex. 4 | Ex. 6 | Ex. 7 | Ex. 8 |
|---|---|---|---|---|---|---|---|
| Flexibility of the honeycomb core material (mm) | 32 | 25 | 20 | 21 | 35 | 33 | 10 |
| Slipping off of the honeycomb core material | ○ | ○ | ○ | ○ | ○ | ○ | ○ |
| Thermal conductivity of the honeycomb core material (kcal/mh° C.) | 0.034 | 0.036 | 0.038 | 0.038 | 0.035 | 0.040 | 0.052 |
| Non-flammability of the honeycomb core material (° C.) | 778 | 784 | 780 | 781 | 796 | 820 | 770 |
| Compression strength (kgf/cm$^2$) | 3.2 | 3.1 | 3.2 | 3.1 | 3.4 | 4.6 | 15.2 |

TABLE 2

|  | Comp. Ex. 1 | Comp. Ex. 2 | Comp. Ex. 3 | Comp. Ex. 4 | Comp. Ex. 6 | Comp. Ex. 7 | Comp. Ex. 8 |
|---|---|---|---|---|---|---|---|
| Flexibility of the honeycomb core material (mm) | 3 | 5 | 55 | 3 | 90 | 95 | 80 |
| Slipping off of the honeycomb core material | x | x | ○ | x | — | — | — |
| Thermal conductivity of the honeycomb core material (kcal/mh° C.) | 0.052 | 0.055 | 0.033 | 0.040 | — | — | — |
| Non-flammability of the honeycomb core material (° C.) | 780 | 782 | 775 | 851 | 795 | 823 | 890 |
| Compression strength (kgf/cm$^2$) | 3.2 | 3.1 | 0.2 | 3.1 | 1.6 | 1.8 | 4.5 |

What is claimed is:

1. A honeycomb core material for a sandwich structure, which comprises a honeycomb body and a filler filled in at least a part of cells thereof,
    wherein the honeycomb body has a cell size of from 5 to 50 mm and a porosity of from 92 to 99.5%, as stipulated in JIS-A6931, and the honeycomb body is a resin-impregnated paper honeycomb or a flame-retardant paper honeycomb, of which an incineration residue in the test stipulated in JIS-P8128 is at least 40%,
    wherein the filler is a composite foam comprising an inorganic foam obtained from a phosphorus-containing acid material (a), a curing agent (b) and, optionally, a blowing agent (c), and an organic foam obtained from a urethane prepolymer having NCO groups (d), and water (e), and
    wherein the material has a flexibility of from 10 mm to 35 mm as measured by the deflection at the centerpoint of a 500 mm span of a 600×300 mm section of the material having a thickness of 40 mm.

2. The material according to claim 1, comprising a flame-retardant paper honeycomb comprising magnesium silicate or aluminum hydroxide in an amount of at least 40 wt %.

3. The material according to claim 1, wherein the phosphorus-containing acid material (a) is at least one member selected from the group consisting of phosphoric acid, phosphorus acid, phosphoric anhydride, condensed phosphoric acids, polyvalent metal salts thereof, and salts of a water-soluble amine with a polyvalent metal salt.

4. The material according to claim 1, wherein the phosphorus-containing acid material (a) is a salt of an acid polyvalent metal phosphate with a water-soluble amine.

5. The material according to claim 1, wherein the curing agent (b) is at least one member selected from the group consisting of a carbonate (b1), a metal oxide and/or a metal hydroxide (b2), and a light metal (b3) which generates a gas when reacted with an acid or an alkali.

6. The material according to claim 1, wherein the curing agent (b) is at least one of a metal oxide or a metal hydroxide (b2), and the blowing agent (c) is at least one of a low boiling point organic solvent or an organic compound which generates a gas by thermal decomposition.

7. A method comprising,
    filling a mixture comprising a phosphorus-containing acid material (a), a curing agent (b), a urethane prepolymer having NCO groups (d), water (e) and, optionally, a blowing agent (c), in cells of a paper honeycomb body having a cell size of from 5 to 50 mm and a porosity of from 92 to 99.5%, as stipulated in JIS-A6931, followed by
    foaming and
    curing, to produce a honeycomb core material having a flexibility of from 10 mm to 35 mm as measured by the deflection at the centerpoint of a 500 mm span of a 600×300 mm section of the material having a thickness of 40 mm.

8. A sandwich structure which comprises the material of claim 1, and one or more surface materials bonded to both sides of the material.

9. The material of claim 1, wherein the phosphorus-containing acid material is a magnesium primary phosphate, the curing agent is basic magnesium carbonate.

10. The material of claim 1, wherein the weight ratio of the inorganic foam to the organic foam is from 3:1 to 50:1.

11. The material of claim 1, wherein the phosphorus-containing acid material (a) is present in an amount of from 3 to 20 wt % in the inorganic foam.

12. A flexible material which comprises a honeycomb body and a filler filled in at least a part of cells thereof,
    wherein the honeycomb body has a cell size of from 3 to 100 mm and a porosity of from 92 to 99.5%, as stipulated in JIS-A6931,
    wherein the filler is a composite foam comprising an inorganic foam obtained from a phosphorus-containing acid material (a), a curing agent (b) and, optionally, a blowing agent (c), and an organic foam obtained from a urethane prepolyrner having NCO groups (d), and water (e), and wherein the flexible material has a flexibility of from 10 mm to 35 mm as measured by the deflection at the centerpoint of a 500 mm span of a 600×300 mm section of the flexible material having a thickness of 40 mm.

13. The flexible material according to claim 12, wherein the honeycomb body comprises a metal, a resin-impregnated honeycomb, or a flame-retardant paper honeycomb, of which an incineration residue in the test stipulated in JIS-P8128 is at least 40%.

14. The flexible material according to claim 13, comprising a flame-retardant paper honeycomb which is a flame-retardant paper honeycomb comprising magnesium silicate or aluminum hydroxide in an amount of at least 40 wt %.

15. The flexible material according to claim 12, wherein the phosphorus-containing acid material (a) is at least one member selected from the group consisting of phosphoric acid, phosphorous acid, phosphoric anhydride, condensed phosphoric acids, polyvalent metal salts thereof, and salts of a water-soluble amine with polyvalent metal salts.

16. The flexible material according to claim 12, wherein the phosphorous-containing acid material (a) is a salt of an acid polyvalent metal phosphate with a water-soluble amine.

17. The flexible material according to claim 12, wherein the curing agent (b) is at least one member selected from the group consisting of a carbonate (b1), a metal oxide and/or a metal hydroxide (b2), and a light metal (b3) which generates a gas when reacted with an acid or an alkali.

18. The flexible material according to claim 12, wherein the curing agent (b) is at least one of a metal oxide or a metal hydroxide (b2), and the blowing agent (c) is at least one of a low boiling point organic solvent or an organic compound which generates a gas by thermal decomposition.

19. A sandwich structure which comprises the flexible material of claim 12, and one or more surface materials bonded to both sides of the flexible material.

20. The material of claim 12, wherein the phosphorous-containing acid material is a magnesium primary phosphate and the curing agent is a basic magnesium carbonate.

21. The material of claim 12, wherein the honeycomb body has a cell size of from 5 to 50 mm.

22. The material of claim 12, wherein the weight ratio of the inorganic foam to the organic foam is from 3:1 to 50:1.

23. The material of claim 12, wherein the phosphorous-containing acid material (a) is present in an amount of from 3 to 20 wt % in the inorganic foam.

* * * * *